(12) United States Patent
Hernacki et al.

(10) Patent No.: US 9,781,159 B1
(45) Date of Patent: Oct. 3, 2017

(54) METHOD, APPARATUS AND SYSTEM FOR PROTECTING IDENTITY INFORMATION

(75) Inventors: Brian Hernacki, San Carlos, CA (US); Sourabh Satish, Fremont, CA (US); Michael Spertus, Wilmette, IL (US)

(73) Assignee: Symantec Corporation, Mountain View, CA (US)

( * ) Notice: Subject to any disclaimer, the term of this patent is extended or adjusted under 35 U.S.C. 154(b) by 2267 days.

(21) Appl. No.: 11/864,303

(22) Filed: Sep. 28, 2007

(51) Int. Cl.
G06F 7/20 (2006.01)
H04L 29/06 (2006.01)

(52) U.S. Cl.
CPC .................. *H04L 63/1483* (2013.01)

(58) Field of Classification Search
CPC ............. H04L 63/1441; H04L 63/1466; H04L 63/1483
USPC .................................................... 706/5; 726/5
See application file for complete search history.

(56) References Cited

U.S. PATENT DOCUMENTS

| 7,681,234 B2 * | 3/2010 | Florencio et al. ............... 726/22 |
| 2007/0006305 A1 * | 1/2007 | Florencio ................ H04L 63/14 726/22 |
| 2007/0239606 A1 * | 10/2007 | Eisen .............................. 705/51 |
| 2008/0276306 A1 * | 11/2008 | Fifer et al. ......................... 726/5 |
| 2010/0004965 A1 * | 1/2010 | Eisen ................................. 705/7 |
| 2010/0094791 A1 * | 4/2010 | Miltonberger ................. 706/46 |
| 2010/0192195 A1 * | 7/2010 | Dunagan et al. ................. 726/1 |

* cited by examiner

*Primary Examiner* — Tamara T Kyle
(74) *Attorney, Agent, or Firm* — Wilmer Cutler Pickering Hale and Dorr LLP

(57) ABSTRACT

A method, apparatus and system for using login information includes an account where login information is used to access the account, a login information usage data for storing the login information used on the account and a manager application coupled to the accounts through a network. The manager application is configured to access the login information and determine at least one potentially or actually compromised account, determine login information related to the at least one potentially or actually compromised account, determine at least one other account having similar login information and notify a user regarding a potential threat to the at least one other account.

17 Claims, 2 Drawing Sheets

METHOD, APPARATUS AND SYSTEM FOR PROTECTING IDENTITY INFORMATION

BACKGROUND OF THE INVENTION

Field of the Invention

Embodiments of the present invention generally relate to computer security and, more particularly, to method and apparatus for protecting identity information.

Description of the Related Art

Present day computer systems exchange information extensively through a telecommunications network, such as the Internet. For security purposes, these interactions involve many transactions that may require a user's identity information such as, login information, passwords, social security number, birthdate or other user credentials, to be entered. The user identity information is under constant threat from malicious agents or phishing attacks, in which a phisher misguides a user to a "fake" website that looks substantially identical to a genuine website. Thereafter, the user discloses his or her identity information to the phishing website while believing they are logging into a genuine website. Here, the user security information is compromised and this information may then be used by the phisher for purposes malicious to or undesirable for the user.

To compound the problem, users often reuse the same login information (e.g., password, username, and the like) for numerous accounts (e.g., websites, applications, etc.). While it may be convenient for the user to reuse the login information and/or derivatives of the login information, this identity information can be easily compromised leaving the user open to identity theft. If the login information is compromised for one site, it may be compromised on every site where the same or similar login information is used. Furthermore, the compromised login information may be used to obtain other identity information (e.g., SSN, driver's license, credit card numbers, other login information, and the like). For example, once access is gained to a particular website by an unscrupulous entity, the personal information on that website is accessible. As more accounts are compromised, more and more personal information can be gathered.

Due to a compromise of the login information at one account, all accounts which share same or similar login information, may potentially be compromised in an "avalanche effect". Even if the first compromised account does not contain any secure information, other potentially compromised accounts may contain secure information, for example, identity information, (e.g., social security number, credit card information and the like).

Having secure information compromised may be extremely detrimental to the user. For example, an identity thief may use the information for fraudulent purposes, such as, charging expenses, submitting instructions, and the like, on behalf of the user. The damage to the user may include bad credit, charges for items not purchased by the user, foul or inaccurate messages sent to a third person and the like. In most cases, the user may not realize their identity information is stolen until substantial damage has occurred.

Accordingly, there exists a need for method and protecting identity information after detection of a potential threat to identity information.

SUMMARY OF THE INVENTION

The present invention generally relates to method, apparatus and system for using login information provided by a user to access an account. According to one embodiment, a method, apparatus and system for using login information includes an account where login information is used to access the account, a login information usage data for storing the login information used on the account and a manager application coupled to the accounts through a network. The manager application is configured to access the login information and determine at least one potentially or actually compromised account, determine login information related to the at least one potentially or actually compromised account, determine at least one other account having similar login information and notify a user regarding a potential threat to the at least one other account.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
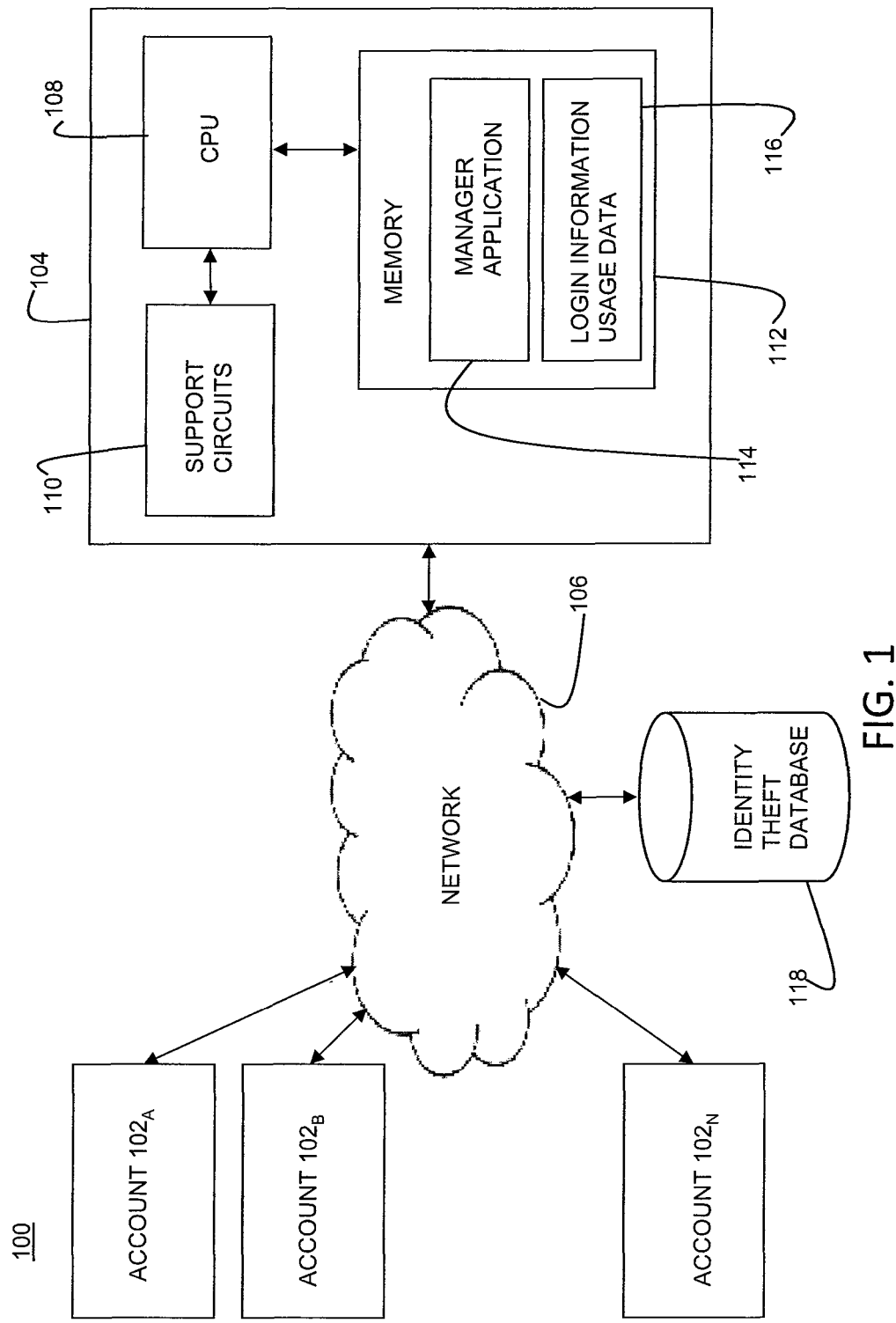
FIG. 1 is a block diagram of an exemplary embodiment of a system according to various embodiments of the present invention.

FIG. 1 is a block diagram of an exemplary embodiment of a system 100 comprising various embodiments of the present invention. The system 100 comprises a plurality of accounts 102 (i.e., illustrated as account $102_A \ldots 102_N$), a user computer 104, and a network 106. The user computer 104 is coupled to the network 106. The network 106 generally forms a portion of the Internet, which may comprise various sub-networks such as Ethernet networks, local area networks, wide area networks, wireless networks, and the like. The communication network 106 provides access for the computer 104 to various websites. The websites may be hosted on servers (not shown). The websites generally comprise one or more accounts 102 for a user.

Use of login information associated with various accounts is tracked by a manager application 114 and may be stored, for example, as login information usage data 116 on the user computer 104. The communication network 106 is further configured to provide access to an identity theft database 118. The identity theft database 118 is configured to store information regarding recently attacked or otherwise compromised websites/accounts. For example, the identity theft database 118 may store information regarding phishing, malware (e.g., malicious software agents), denial of service (e.g., an attack where various resources of a computer are made unavailable to its users) or any other attack that can potentially breach or compromise security of the accounts 102 (e.g., websites) of the user computer 104. In one embodiment, the identity theft database 118 may provide information about recently phished attacks or compromised accounts, for example, through a security subscription service configured to provide such information.

Further, the computer 104 comprises, without limitation, a CPU 108, various support circuits 110, and a memory 112. The CPU 108 may be one or more of any commercially available microprocessors or microcontrollers. The support circuits 110 comprise circuits and devices that support the operation of the CPU 108. Support circuits 110 include, for example, cache, input/output circuits, system bus, PCI bus power supplies, clock circuits, and the like. Those skilled in the art will appreciate that the hardware depicted in the FIG. 1 may vary from one computer system to another. For example, other peripheral devices, such as optical disk drives, graphics card, data storage devices, various other input devices and the like, may also be used in addition to or in place of the hardware depicted.

Various types of software processes or modules and information reside within the memory 112. For example, various processes such as an Operating System (OS) kernel (not shown), a software library (not shown) may be resident in the memory. FIG. 1 illustrates other software modules, for example, the manager application module (or "the manager application") 114 and the login information usage data 116 as being resident in the memory 112. The manager application 114 is configured to track login information used to access website accounts of a user, generally represented by $102_A$, $102_B$ ... $102_N$ (e.g., on websites, applications). The login information includes a password and a username, among other information and/or data. For example, the information may include some or all of the secure or identity information that is entered into any website, or any secure website. Thus, when an account is compromised, the manager can identify what user information may be compromised. According to alternate embodiments, the manager application 114 is a software application that resides within another software module in the memory 112, for example, a browser application.

The login information usage data 116 is configured to store login information for each website tracked by the manager application 114. In one embodiment, the manager application 114 is configured to associate the login information provided by the user with a Uniform Resource Locator (URL) of the corresponding account. The manager application 114 is configured to access the login information stored in the login information usage data 116. Further, the manager application 114 is configured to determine potentially or actually compromised account. In one embodiment, the identity theft database 118 is coupled to the manager application 114, and the manager application 114 utilizes the identity theft database 118 to determine the potentially or actually compromised account. For example, the subscription service may be used for transmitting identity theft information such as recent phishing attacks or hacked accounts to the manager application 114. In another embodiment, another application may provide information on potentially or actually compromised accounts to the manager application 114. The manager application 114 is configured to determine login information related to potentially or actually compromised account using the login information usage data 116. The manager application 114 is further configured to determine other accounts having similar login information using the login information usage data 116.

The manager application 114 tracks usage data of the login information to identify all the other accounts having the similar login information as the login information of the potentially or actually compromised accounts. For example, if the login information of other accounts is similar to the login information of the potentially or actually compromised account, then the manager application 114 determines whether the other accounts have either the same or a derivative of the login information of the potentially or actually compromised account. If the other accounts have login information that is same or a derivative of the login information of the potentially or actually compromised account, then the other accounts are potentially under threat of being compromised.

The manager application 114 is further configured to notify a user regarding a potential threat to the other accounts. The manager application 114 is also configured to determine a potential threat to identity information of a user such as social security number and/or credit card information. The manager application 114 may track accounts that include specific identity information, for example, in the same way at the manager application 114 tracks the login information. When the manager application 114 detects a potentially or actually compromised account, or accounts under potential threat, it notifies the user of a potential threat to the specific identity information. The manager application 114 informs the user that the identity information present at potentially or actually compromised accounts is under potential threat. In some embodiments, where the manager application 114 does not track accounts that include identity information, the manager application 114 may issue a general notification to the user of potential identity information theft from all potentially or actually compromised accounts, and/or accounts under potential threats.

Figure 2:
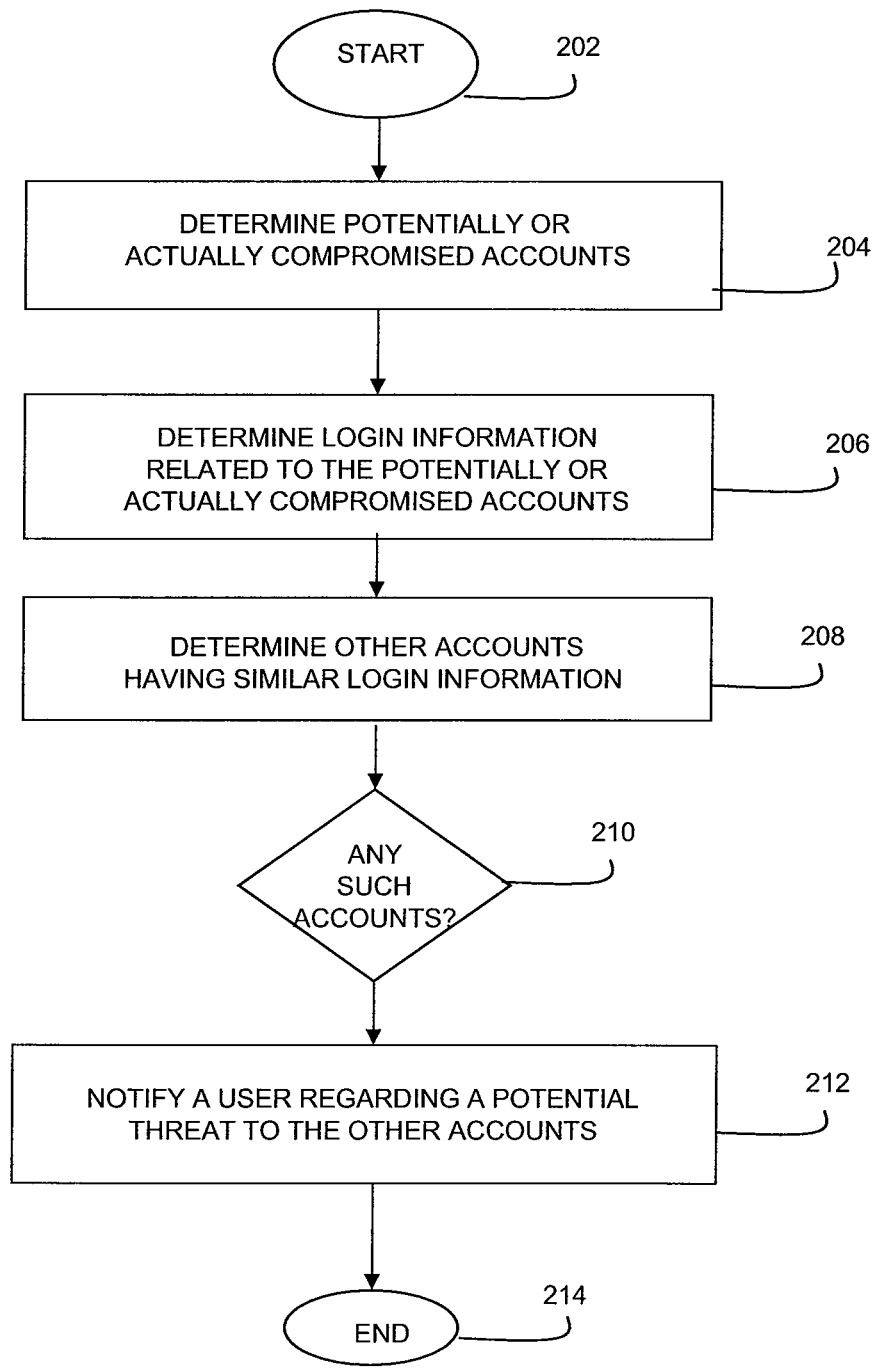
FIG. 2 is a flow chart illustrating a method for protecting identity information according to various embodiments of the present invention.

FIG. 2 illustrates a method 200 for using login information, according to another embodiment of the present invention. The method 200 may be implemented by a software application, for example, the manager application 114 resident in a computer memory, such as the memory 112. The login information may include a user name and a password corresponding to each website account, for example, the accounts $102_A$, $102_B$ ... $102_N$. The method 200 starts at step 202 and proceeds to step 204, wherein the manager application 114 determines one or more potentially or actually compromised accounts. In one embodiment, the manager application 114 determines one or more potentially or actually compromised accounts by utilizing the identity theft database 118 for information regarding recent phishing attacks and/or compromised accounts. Those skilled in the art will appreciate that potentially or actually compromised accounts may be determined by other means, for example, from another application configured to detect and provide such information, among other methods.

At step 206, login information related to the potentially or actually compromised accounts is determined. For example, the manager application 114 determines the login information related to the potentially or actually compromised accounts using the login information usage data 116. At step 208, the manager application 114, for example, searches for login information that is the same or similar to the login information related to the potentially or actually compromised accounts. In one embodiment, the manager application 114 performs a character search or a phrase search on character strings representing the login information. In another embodiment, the manager application 114 searches for other accounts that have a derivative of the login information related to the potentially or actually compromised account.

At step 210, the method 200 determines whether there are other accounts that have the same or similar login information as the login information related to the potentially or actually compromised accounts. If there are such other accounts the method 200 determines that the other accounts are potentially under threat of being compromised. In one embodiment, usage data of the login information of potentially or actually compromised accounts from the login information usage data 116 is accessed by the manager application 114 to identify other accounts having the same or similar login information.

At step 212, the method 200 notifies a user that other accounts having similar login information being potentially under threat. Based on this notification, the user may decide to change the login information, for example the username or password, for the potentially or actually compromised accounts as well as for the other accounts potentially under threat. The method 200 ends at step 214. According to various other embodiments, the user may also want to intimate the compromised or potentially compromised accounts' owner or administrator. According to certain embodiments, the manager application 114 may prompt the user to change the user login information and/or remove sensitive identity information from such accounts. In one embodiment, the manager application 114 may further inform, on initiation by the user or automatically, corresponding websites of compromised accounts, and the compromised login information on behalf of the user.

Due to potentially or actually compromised accounts, the identity information of the user may be at risk. The user identity information includes social security number, credit card information, and the like. Typically, users submit such identity information on various website accounts. When an account has been potentially or actually compromised, the identity information present at the account is under threat. Certain embodiments of the present invention provide a method for determining a potential threat to the identity information. The identity theft information includes recent information regarding a phishing attack, a malware attack, a denial of service attack, or any other security breach at a website or an account. On determining actually or potentially compromised accounts, the method alerts the user about a potential threat to the identity information being present at actually or potentially compromised accounts.

It is appreciated here that the methods as disclosed in accordance with various embodiments may be implemented by a software module, such as the manager application 114 of FIG. 1. Further, according to certain embodiments, the software module 114 may be installable on the computer system 104 by a user. The software module 114 may be stored in the memory 112 of the computer 104. In alternative embodiments, the software module 114 can be stored on a computer readable medium which includes floppy, CD, hard disk, memory sticks, and any primary or secondary storage.

Those skilled in the art will appreciate, that while the manager application 114 has been referenced from memory 112, the manager application 114 may be implemented as an application specific hardware in a computer, for example the computer 104.

It is appreciated here that while the invention has been described with reference to login information, which may form a portion of the user identity information, various embodiments of the invention described herein are not limited to login information, and are similarly applicable to other elements of user identity information, or information that may be available to a malicious agent based on the misappropriation of the user identity information. All such variants are included within the scope of the present invention recited by the appended claims.

Those skilled in the art will appreciate that the methods and systems, and variations disclosed herein advantageously help users, particularly a common user, to protect their login information and identity information against common security threats, in an advanced manner, with a higher level of reliability. Further, users may detect any such compromise of the login information at one account and further detect potentially compromised accounts due to compromise of the login information of one account, relatively early. The methods and systems, and variants disclosed further advantageously provides for detecting potentially compromise accounts based upon the login information and further other identity information that may be at risk due to the potentially compromised accounts. Various embodiments of the invention also provide for early detection and warning of potentially compromised accounts and other identity information to the users.

While the foregoing is directed to embodiments of the present invention, other and further embodiments of the invention may be devised without departing from the basic scope thereof, and the scope thereof is determined by the claims that follow.

The invention claimed is:

1. A method for using account login information, comprising: determining at least one potentially or actually compromised account using at least one computer; determining actual user login information associated with the at least one potentially or actually compromised account using stored login information usage data associated with the at least one potentially or actually compromised account; determining at least one other account having similar login information by tracking usage data of the actual user login information, wherein tracking usage data comprises searching for additional accounts that have login information that is identical to or a derivative of the actual user login information associated with the at least one potentially or actually compromised account and searching for additional accounts that have login information that is a derivative of the actual user login information associated with the at least one potentially or actually compromised account; and notifying a user regarding a threat to the at least one other account, wherein the user notification comprises at least one of prompting the user to change the actual user login information, prompting the user to remove sensitive information from the at least one other account, and informing corresponding websites of compromised accounts.

2. The method of claim 1, wherein the actual user login information comprises a password and a username.

3. The method of claim 1, wherein notifying a user further comprises informing corresponding websites of compromised login information on behalf of a user.

4. The method of claim 1, wherein the step of determining the at least one potentially or actually compromised account further comprises accessing a database having identity theft information.

5. The method of claim 1, wherein the step of determining the at least one potentially or actually compromised account further comprises receiving identity theft information through a subscription service.

6. The method of claim 1, further comprising determining a potential threat to identity information.

7. The method of claim 6, wherein the threat to identity information comprises at least one of a phishing attack, a denial of service attack, a malware attack, or a security breach at a website.

8. An apparatus for using account login information, comprising: a memory storing login information usage data comprising actual user login information used on at least one account; and a manager application for accessing the actual user login information, determining at least one potentially or actually compromised account, determining actual user login information associated with the at least one potentially or actually compromised account using stored login information usage data associated with the at least one potentially or actually compromised account, determining at least one other account having similar login information using the login information usage data by tracking the login information usage data, and notifying a user regarding a potential threat to the at least one other account, wherein tracking usage data comprises searching for additional accounts that have login information that is identical to or a derivative of the actual user login information associated with the at least one potentially or actually compromised account and searching for additional accounts that have login information that is a derivative of the actual user login information associated with the at least one potentially or actually compromised account, wherein the user notification comprises at least one of prompting the user to change the actual user login information, prompting the user to remove sensitive information from the at least one other account, and informing corresponding websites of compromised accounts.

9. The apparatus of claim 8, further comprising a database coupled to the manager application for storing identity theft information used to determine the at least one potentially or actually compromised account.

10. The apparatus of claim 8, further comprising a subscription service for transmitting identity theft information to the manager application used to determine the at least one potentially or actually compromised account.

11. The apparatus of claim 8, wherein the manager application determines a potential threat to identity information.

12. The apparatus of claim 8, wherein notifying a user further comprises informing corresponding websites of compromised login information on behalf of a user.

13. A system for using account login information, comprising: at least one account where login information is used to access the at least one account; a network coupling the at least one account to a computer; and a computer comprising: a memory for storing login information usage data comprising actual user login information used on the at least one account; and a manager application for accessing the actual user login information, determining at least one potentially or actually compromised account, determining actual user login information associated with the at least one potentially or actually compromised account using stored login information usage data associated with the at least one potentially or actually compromised account, determining at least one other account having similar login information using the login information usage data by tracking the login information usage data, and notifying a user regarding a potential threat to the at least one other account, wherein tracking usage data comprises searching for additional accounts that have login information that is identical to or a derivative of the actual user login information associated with the at least one potentially or actually compromised account and searching for additional accounts that have login information that is a derivative of the actual user login information associated with the at least one potentially or actually compromised account, wherein the user notification comprises at least one of prompting the user to change the actual user login information, prompting the user to remove sensitive information from the at least one other account, and informing corresponding websites of compromised accounts.

14. The system of claim 13, further comprising a database coupled to the manager application for storing identity theft information used to determine the at least one potentially or actually compromised account.

15. The system of claim 13, further comprising a subscription service for transmitting identity theft information to the manager application used to determine the at least one potentially or actually compromised account.

16. The system of claim 13, wherein notifying a user further comprises informing corresponding websites of compromised login information on behalf of a user.

17. The system of claim 13, wherein the manager application determines a potential threat to identity information.

\* \* \* \* \*